2,964,550
ORGANOSILYLALKYL DERIVATIVES OF PHOSPHORUS, ARSENIC, ANTIMONY, AND BISMUTH

Dietmar Seyferth, Arlington, Mass., assignor to Metal & Thermit Corporation, Woodbridge Township, N.J., a corporation of New Jersey No Drawing. Filed Sept. 24, 1957, Ser. No. 685,817

10 Claims. (Cl. 260—440)

The present invention relates to metal and metalloid atoms bridged by an organic radical.

New compounds have now been discovered in which an organic radical serves to bind a silicon atom with the atoms of phosphorus, arsenic, antimony or bismuth.

It is an object of this invention to provide novel organometal and metalloid compounds.

Another object of this invention is to provide a new process for the preparation of these novel organo-metal and metalloid compounds.

Generally speaking, the present invention contemplates new compounds having the general formula:

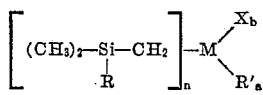

wherein R and R' represent organic radicals, M is selected from the class consisting of phosphorus, arsenic, antimony and bismuth, and X is a halide; and wherein $n$ has the values 1, 2, and 3, $a$ and $b$ have the values 0, 1 and 2, and the sum of $n+a+b$ equals 3. This invention envisages the formation of these new compounds by reacting a Grignard reagent of the following general formula:

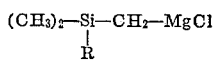

with a substance having the following general formula:

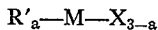

wherein R', X, and a are as previously defined. The starting materials were prepared by the alkylation and arylation of chloromethyldimethylchlorosilane with alkyl or aryl Grignard reagents in diethyl ether or tetrahydrofuran. Example I shows the preparation of trimethylsilylmethyl chloride.

Example I.—Chloromethyltrimethylsilane

Chloromethyltrimethylsilane, B.P. 98–99° C., was prepared by methylation of chloromethyldmethylchlorosilane with methylmagnesium bromide in diethyl ether solution.

The other starting materials were prepared in a similar fashion by treating chloromethyldmethylchlorosilane with n-butylmagnesium chloride in diethyl ether, cyclohexylmagnesium chloride in tetrahydrofuran, n-hexylmagnesium chloride in tetrahydrofuran, n-dodecylmagnesium chloride in tetrahydrofuran, phenylmagnesium bromide in diethyl ether, p-chlorophenylmagnesium bromide in diethyl ether, p-tolylmagnesium bromide in diethyl ether.

In the process for the preparation of the compounds of this invention the Grignards of the alkyl- and aryl- substituted dimethylsilylmethylchlorides are preferably prepared in tetrahydrofuran. To these alkyl- and aryl- substituted dimethylsilylmethylmagnesium chlorides in tetrahydrofuran are preferably added a solution of the metal or metalloid halide, which may bear an alkyl or aryl substituent, in an inert solvent or in tetrahydrofuran. The addition is at such a rate as to maintain a gentle spontaneous reflux. Where necessary, heat may be supplied to maintain reflux conditions during the addition. The temperature during the addition is preferably maintained at between 60–100° C. After the addition is over, refluxing is continued, if necessary, until the Grignard reagent is entirely exhausted. The product is then isolated.

For the purpose of giving those skilled in the art a better understanding of the invention, the following illustrative examples are given.

Example II.—Tris-(Trimethylsilylmethyl) Arsine

To 0.4 mole of trimethylsilylmethylmagnesium chloride in 200 ml. of tetrahydrofuran was added 18.1 g. (0.1 mole) of arsenic trichloride, diluted with 20 ml. of benzene, at such a rate that a moderate reflux was maintained. The reaction mixture was refluxed for 4.5 hours after the addition was completed. The mixture was then allowed to cool to room temperature and was subsequently hydrolyzed with 70 ml. of saturated ammonium chloride solution. The organic layer was decanted and the residual salts were washed with diethyl ether, the washings being added to the organic layer. The solvents were distilled at atmospheric pressure. The residue on cooling formed white needles. These were treated with decolorizing charcoal and recrystallized from diethyl ether. A yield of 27 g. (80%) of recrystallized tris-(trimethylsilylmethyl)arsine, M.P. 67–68.5°, was obtained.

Analysis.—Calcd. for $C_{12}H_{33}Si_3As$: C, 42.82; H, 10.01; mol. wt. 337. Found: C, 42.90; H, 10.08; mol. wt., 325. The arsine did not oxidize rapidly in air and could be kept in a brown screw-cap bottle for longer periods. The compound has a distinctly unpleasant odor.

Example III.—Tris-(trimethylsilylmetal)phosphine

Tris-(trimethylsilylmethyl)phosphine was prepared according to the procedure in Example II from 0.4 mole of $Me_3SiCH_2MgCl$ in tetrahydrofuran and 0.1 mole of phosphorus tribromide in 71% yield. The white crystals were recrystallized from a petroleum ether-methanol mixture to give pure compound, M.P. 110–113°

Analysis.—Calcd. for $C_{12}H_{33}Si_3P$: C, 49.24; H, 11.37; P, 10.34. Found: C, 48.90; H, 11.48; P, 10.37. The phosphorus compound, like the arsine, had a distinctly unpleasant odor. It did not appear to oxidize rapidly in air; it did, however, turn from white to light brown in color on standing several months in a glass-stoppered flask, and the material was then no longer completely soluble in petroleum ether, indicating that slow oxidation had taken place.

Example IV.—Tris-(trimethylsilylmethyl)stibine

Tris-(trimethylsilylmethyl)stibine was prepared according to the procedure in Example II from 0.4 mole of $Me_3SiCH_2MgCl$ and 0.1 mole of an antimony trichloride. Extreme precautions had to be taken because of the facile oxidation of the stibine. The white crystalline stibine was recrystallized from a petroleum ether-methanol mixture to give a 74% yield of pure compound, M.P. 64–65° (sealed tube).

Analysis.—Calcd. for $C_{12}H_{33}Si_3Sb$: C, 37.58; H, 8.68. Found: C, 37.29; H, 8.62.

Example V.—Tris-(trimethylsilylmethyl)bismuth

Tris-(trimethylsilylmethyl)bismuth was prepared using the procedure of Example II from 0.4 mole of $$Me_3SiCH_2MgCl$$

and 0.1 mole of bismuth trichloride in 62% yield. Extensive decomposition occurred during removal of the solvent. The grey crystalline residue was dissolved in diethyl ether, filtered through Filter-Aid, and the ether solvent was removed in vacuo. The residue was slurried in methanol, filtered and dried in vacuo to give white crystals of the bismuth compound.

Analysis.—Calcd. for $C_{12}H_{33}Si_3Bi$: C, 30.62; H, 7.07. Found: C, 26.97; H, 6.20. The impure product became partially liquid at 107–109°; at 140° decomposition occurred.

*Example VI.—Tris-(dimethyl-n-butylsilylmethyl)arsine*

Following the procedure of Example II, 0.4 mole of (dimethyl-n-butylsilylmethylmagnesium)chloride is reacted with 0.1 mole of arsenic trichloride to yield tris-(dimethyl-n-butylsilylmethyl)arsine.

*Example VII.—Tris-(dimethylcyclohexylsilylmethyl)arsine*

This product is prepared from 0.4 mole of (dimethylcyclohexylsilylmethylmagnesium) chloride and 0.1 mole of arsenic trichloride by following the procedure of Example II.

*Example VIII.—Chloro-di-(trimethylsilylmethyl)arsine*

To 200 ml. of tetrahydrofuran containing 36.2 g. (0.2 mole) of arsenic trichloride and diluted with 20 ml. of benzene is added 0.4 mole of trimethylsilylmethylmagnesium chloride, at such a rate that spontaneous reflux is maintained. The reaction mixture is refluxed for 45 hours after the completion of the addition. The mixture is allowed to cool to room temperature, a further quantity of benzene is added. The salts which deposit are removed by filtration and washed with benzene. The washings are combined with the mother liquor and, after the solvents are removed, the product is isolated by vacuum distillation.

*Example IX.—Tris-(Dimethyl-n-hexylsilylmethyl)phosphine*

Following the procedure of Example II, 0.4 mole of dimethyl-n-hexylsilylmethylmagnesium chloride is reacted with 0.1 mole of phosphorus tribromide to yield tris-(dimethyl-n-hexylsilylmethyl)phosphine.

*Example X.—Phenyl-di-(trimethylsilylmethyl)phosphine*

Following the procedure of Example II, 0.4 mole of trimethylsilylmethylmagnesium chloride is reacted with 0.2 mole of dibromophenylphosphine to yield phenyl-di-(trimethylsilylmethyl)phosphine.

*Example XI.—Tris-(dimethyl-n-dodecylsilylmethyl)phosphine*

Following the procedure of Example II, 0.4 mole of dimethyl-n-dodecylsilylmethylmagnesium chloride is reacted with 0.1 mole of phosphorus tribromide to yield tris-(dimethyl-n-dodecylsilylmethyl)phosphine.

*Example XII.—Di-(dimethylphenylsilylmethyl)-n-butylphosphine*

Following the procedure of Example II, 0.4 mole of dimethylphenylsilylmethylmagnesium chloride is reacted with 0.4 mole of n-butyldibromophosphine to yield di-(dimethylphenylsilylmethyl)-n-butylphosphine.

*Example XIII.—Tris-(dimethyl-p-chlorophenylsilylmethyl)phosphine*

Following the procedure of Example II, 0.4 mole of dimethyl-p-chlorophenylsilylmethylmagnesium chloride is reacted with 0.1 mole of phosphorus tribromide to yield tris-(dimethyl-p-chlorophenylsilylmethyl)phosphine.

*Example XIV.—Tris-(dimethyl-p-tolylsilylmethyl)stibine*

Following the procedure of Example II, 0.4 mole of dimethyl-p-tolylsilylmethylmagnesium chloride is reacted with 0.1 mole of antimony trichloride to yield tris-(dimethyl-p-tolylsilylmethyl)stibine.

*Example XV.—Dichloro(trimethylsilylmethyl)stibine*

Following the procedure of Example VIII, 0.4 mole of trimethylsilylmethylmagnesium chloride is reacted with 0.4 mole of antimony trichloride to yield dichloro(trimethylsilylmethyl)stibine.

When the compounds of this invention are added to silicone and siloxane type polymers used as lubricants they enhance the lubricating quality of the fluid.

As many embodiments of this invention may be made without departing from the spirit and scope thereof, it is to be understood that the invention is not limited to the specific embodiments set forth but is to be restricted solely by the scope of the appended claims.

I claim:

1. A compound of the formula:

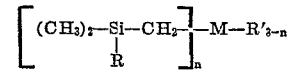

wherein R and R' are selected from the class consisting of alkyl and aryl radicals; M is selected from the class consisting of phosphorus, arsenic, antimony and bismuth; and $n$ has the value 1, 2 and 3.

2. A compound of the formula:

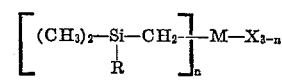

wherein R is selected from the class consisting of alkyl and aryl radicals; M is selected from the class consisting of phosphorus, arsenic, antimony and bismuth; $n$ has the value 1, 2 and 3; and X is a halide.

3. A compound of the formula:

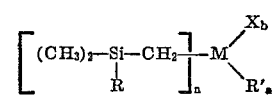

wherein R and R' are selected from the class consisting of alkyl and aryl radicals; M is selected from the class consisting of phosphorus, arsenic, antimony and bismuth; X is a halide; n has the values 1, 2 and 3; $a$ and $b$ have the values 0, 1 and 2, and the sum of $n+a+b$ equals 3.

4. The compound of claim 3 wherein M is phosphorus.

5. The compound of claim 3 wherein M is antimony.

6. The compound of claim 3 wherein M is arsenic.

7. The compound of claim 3 wherein M is bismuth.

8. The compound of claim 3 wherein R is an alkyl radical.

9. The compound of claim 3 wherein R is an aryl radical.

10. The compound of claim 3 wherein R is methyl and n has the value 3.

References Cited in the file of this patent

UNITED STATES PATENTS 2,673,210    Frisch et al. ———————— Mar. 23, 1954